(12) United States Patent  (10) Patent No.: US 7,567,392 B2
Tamura  (45) Date of Patent: Jul. 28, 2009

(54) IMAGE CAPTURE LENS AND IMAGE CAPTURE APPARATUS

(75) Inventor: Masaki Tamura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/605,293

(22) Filed: Nov. 29, 2006

(65) Prior Publication Data

US 2007/0146903 A1  Jun. 28, 2007

(30) Foreign Application Priority Data

Dec. 1, 2005  (JP)  ............... P2005-347461

(51) Int. Cl.
G02B 9/14  (2006.01)
(52) U.S. Cl. .................. 359/785; 359/716
(58) Field of Classification Search ......... 359/708–719, 359/785
See application file for complete search history.

(56) References Cited

U.S. PATENT DOCUMENTS

| 6,980,372 | B1 * | 12/2005 | Do ............................ 359/716 |
| 2004/0179274 | A1 * | 9/2004 | Amanai ..................... 359/785 |
| 2004/0190162 | A1 | 9/2004 | Sato | |
| 2005/0002116 | A1 | 1/2005 | Nakamura | |

FOREIGN PATENT DOCUMENTS

| EP | 1 562 061 A1 | 8/2005 |
| JP | 2004-004566 | 1/2004 |
| JP | 2004-219807 | 8/2004 |
| JP | 2004-219982 | 8/2004 |
| JP | 2005-062680 | 3/2005 |

OTHER PUBLICATIONS

European Search Report; Application No./Patent No. 06125273.0-2217; Dated Apr. 16, 2007.

* cited by examiner

Primary Examiner—Scott J Sugarman
Assistant Examiner—Vipin M Patel
(74) Attorney, Agent, or Firm—Rader Fishman & Grauer PLLC; Ronald P. Kananen

(57) ABSTRACT

An image capture lens includes, in following order from an object side, a first lens made of glass which has a meniscus shape with a convex surface facing the object side and has positive refractive power, an aperture stop, a second lens made of glass which has a meniscus shape with a convex surface facing an image side and has negative refractive power, and a third lens made of resin which has a convex surface facing the object side and has positive refractive power. The image capture lens satisfies following conditional formulae (1) and (2):

$$f2/f < -3.5, \text{ and} \qquad (1)$$

$$f3/f > 3.5, \qquad (2)$$

where f: focal length of the entire lens system;
  f2: focal length of the second lens; and
  f3: focal length of the third lens.

3 Claims, 6 Drawing Sheets

IMAGE CAPTURE LENS AND IMAGE CAPTURE APPARATUS

BACKGROUND OF THE INVENTION

1. Field of the Invention

The present invention relates to an image capture lens and image capture apparatus, and more particularly to an image capture lens which is suitable for use in a small-sized image capture apparatus using a solid-state image capture device such as a CCD (Charge Coupled Device) or a CMOS (Complementary Metal-Oxide Semiconductor), as well as to an image capture apparatus using such an image capture lens.

2. Description of Related Art

Mobile telephones with cameras and digital still cameras using solid-state image capture devices such as CCDs or CMOSs have heretofore been known. In the field of such an image capture apparatus, demand is rising for far more miniaturization as well as for a built-in image-taking lens having a small size and a short total length.

In recent years, small-sized image capture equipment such as mobile telephones with cameras have been miniaturized more and more and the pixel resolution of image capture devices have become higher and higher, so that models equipped with image capture devices having pixel resolutions not lower than a megapixel resolution have been spread as popular models. Accordingly, it has been demanded that image capture lenses to be incorporated into such image capture equipment and devices have high lens performance capable of solid-state image capture equipment of high-resolution pixels.

An image capture lens made of three lens elements is generally used as such a small-sized and high-performance image capture lens, and known examples are image capture-lenses described in Patent Literature 1 (Japanese Patent Application Publication Number 2004-4566) and Patent Literature 2 (Japanese Patent Application Publication Number 2004-219807).

SUMMARY OF THE INVENTION

Each of the image capture lenses described in the above-cited Patent Literatures 1 and 2 is a image capture lens made of three lens elements capable of current image capture devices of high-resolution pixels, and nearly all of the constituent lenses are resin-made lenses. Such an optical system has optical performance which is comparatively good in terms of design values, but if the ambient temperature of the image capture lens varies during use, the optical performance remarkably deteriorates.

For example, in a pan-focus camera having a macro position, the amount of variation of back focus due to a variation in ambient temperature is extremely large, exceeding a performance deterioration level allowable for cameras equipped with image capture devices of high-resolution pixels. In addition, in a camera having an AF (Auto Focus) function, there is a risk that an increase in the movement stroke of a focusing lens incurs an increase in the total length of the lens system and an increase in the difference in focus position (a curvature of field) between the center and the periphery of the screen causes a deterioration of optical performance.

Accordingly, it is desirable to provide an extremely small-sized image capture lens which has good optical performance capable of image capture devices having high-resolution pixels and has optical characteristics which do not suffer large variations due to temperature variations in a normal temperature range. The present invention has been made in view of the above-mentioned issues.

According to an embodiment of the present invention, there is provided an image capture lens which includes, in the following order from an object side, a first lens made of glass which has a meniscus shape with a convex surface facing the object side and has positive refractive power, an aperture stop, a second lens made of glass which has a meniscus shape with a convex surface facing an image side and has negative refractive power, and a third lens made of resin which has a convex surface facing the object side and has positive refractive power. The image capture lens satisfies the following conditional formulae (1) f2/f<−3.5 and (2) f3/f>3.5, where f represents the focal length of the entire lens system, f2 represents the focal length of the second lens, and f3 represents the focal length of the third lens.

According to another embodiment of the present invention, there is provided an image capture apparatus which includes an image capture lens and an image capture device which converts an optical image formed by the image capture lens into an electrical signal. The image capture lens includes, in the following order from an object side, a first lens made of glass which has a meniscus shape with a convex surface facing the object side and has positive refractive power, an aperture stop, a second lens made of glass which has a meniscus shape with a convex surface facing an image side and has negative refractive power, and a third lens made of resin which has a convex surface facing the object side and has positive refractive power. The image capture lens satisfies the following conditional formulae (1) f2/f<−3.5 and (2) f3/f>3.5, where f represents the focal length of the entire lens system, f2 represents the focal length of the second lens, and f3 represents the focal length of the third lens.

According to the above-mentioned embodiments of the present invention, it is possible to provide a far more miniaturized construction which has good optical performance capable of image capture devices having high-resolution pixels and has optical characteristics which do not suffer large variations due to temperature variations.

The image capture lens according to the embodiment of the present invention can have a far more miniaturized construction which has good optical performance capable of image capture devices having high-resolution pixels and has optical characteristics which do not suffer large variations due to temperature variations.

Furthermore, the image capture apparatus according to the embodiment of the present invention can be constructed in an extremely miniaturized form and can acquire images of high quality by using an image capture device of high-resolution pixels, and further can stably acquire images of high quality because the image capture apparatus does not suffer a large deterioration in image quality due to a variation in ambient temperature.

Furthermore, in the above-mentioned embodiment of the present invention, all surfaces of the first lens, the second lens and the third lens are formed in aspherical shapes, so that various aberrations, particularly spherical aberration, coma and distortion, can be highly corrected.

Furthermore, in the image capture lens according to the embodiment of the present invention, the following conditional formulae (3) Fno<3.5 and (4) 0.19≦d/f≦0.25 are satisfied, where Fno represents the F number of the image capture lens, f represents the focal length of the entire lens system, and d represents the distance along the optical axis from the image-side surface of the first lens to the object-side surface of the second lens. Accordingly, the image capture lens makes it possible to maintain the sensitivity necessary for an image capture device of high-resolution pixels, and the total length of the image capture lens can be reduced. Furthermore, the image capture lens makes it possible to correct abaxial aberration, particularly astigmatism and a curvature of field.

BRIEF DESCRIPTION OF THE DRAWINGS

The invention will become more readily appreciated and understood from the following detailed description of preferred embodiments and numerical embodiments of the invention when taken in conjunction with the accompanying drawings, in which.

DETAILED DESCRIPTION OF EMBODIMENTS

Figure 1:
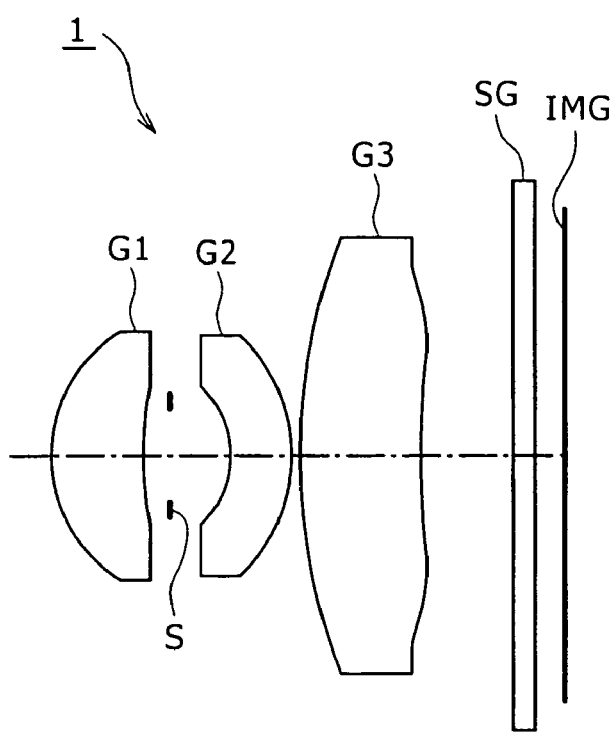
FIG. 1 is a schematic view showing a lens construction of the first embodiment of the image capture lens.

Embodiments of an image capture lens and an image capture apparatus according to the present invention will be described below with reference to the accompanying drawings.

The image capture lens includes, in the following order from an object side, a first lens made of glass which has a meniscus shape with a convex surface facing the object side and has positive refractive power, an aperture stop, a second lens made of glass which has a meniscus shape with a convex surface facing an image side and has negative refractive power, and a third lens made of resin which has a convex surface facing the object side and has positive refractive power, and satisfies the following conditional formulae (1) and (2):

$$f2/f < -3.5, \text{ and} \quad (1)$$

$$f3/f > 3.5, \quad (2)$$

where f: focal length of the entire lens system;
  f2: focal length of the second lens; and
  f3: focal length of the third lens.

According to the above-mentioned construction, it is possible to achieve an extremely small-sized image capture lens which has good optical performance capable of image capture devices having high-resolution pixels and has optical characteristics which do not suffer large variations due to temperature variations.

The conditional formula (1) provides the ratio of the focal length of the entire lens system and the focal length of the second lens and restricts the refractive power of the second lens. If the f2/f ratio is not smaller than the specified value of the conditional formula (1), it is difficult to correct abaxial aberration, particularly astigmatism and a curvature of field.

The conditional formula (2) provides the ratio of the focal length of the entire lens system to the focal length of the third lens and restricts the refractive power of the third lens. The third lens mainly serves the role of correcting the position of an image plane, and if the f3/f ratio is not greater than the specified value of the conditional formula (1), the refractive power of the third lens increases and contributes to an increased proportion of the refractive power of the entire lens system. If the refractive power of the third lens formed of a resin lens increases, the variation of the optical performance due to temperature variations increases, so that it becomes difficult to maintain the necessary optical performance during temperature variations.

In the image capture lens, all surfaces of the first lens, the second lens and the third lens are desirably formed in aspherical shapes, so that spherical aberration, coma and distortion can be highly corrected.

The image capture lens desirably satisfies the following conditional formulae (3) and (4):

$$Fno < 3.5, \text{ and} \quad (3)$$

$$0.19 \leq d/f \leq 0.25, \quad (4)$$

where Fno represents the F number of the image capture lens, f represents the focal length of the entire lens system, and d represents the distance along the optical axis from an image-side surface of the first lens to an object-side surface of the second lens.

The conditional formula (3) provides the F number of the lens. In a current mainstream image capture device of small size and high-resolution pixels, the pixel pitch is extremely small, and the image capture lens desirably satisfies the conditional formula (3) to maintain the necessary sensitivity.

The conditional formula (4) provides the ratio of the focal length of the entire lens system to the distance along the optical axis from the image-side surface of the first lens to the object-side surface of the second lens, and specifies the separation between the first lens and the second lens between which the aperture stop is inserted. If the value of d/f falls below the lower limit value of the conditional formula (4), the separation between the first lens and the second lens becomes narrow, so that the thickness of the aperture stop needs to be decreased.

Such aperture stop typically uses a resin aperture stop, and if the thickness of the aperture stop is thin, the formation of its aperture section will become imperfect, thus incurring occurrence of a shower ghost and the like. On the other hand, if the value of d/f exceeds the upper limit value of the conditional formula (4), the separation between the first lens and the second lens becomes wide, so that the total length of the image capture lens increases. Furthermore, it becomes difficult to correct abaxial aberration, particularly astigmatism and a curvature of field.

Three preferred embodiments of the image capture lens and numerical embodiments in which specific numerical values are applied to the embodiments will be described below with reference to the accompanying drawings and the following tables.

It is assumed here that the image capture lens adopts aspherical surfaces each having an aspherical shape defined by the following formula (1):

$$Z = \frac{Y^2/R}{1+\sqrt{1-(1+K)(Y/R)^2}} + AY^4 + BY^6 + \ldots + HY^{18} \quad [\text{formula 1}]$$

where Z represents the depth of the aspherical surface, Y represents the height from the optical axis, R represents the curvature of radius, K represents the conical constant, A, B, C, D, E, F, G and H represent aspherical coefficients of the 4th-, 6th-, 8th-, 10th-, 12th-, 14th-, 16th- and 18th-orders, respectively.

Figure 3:
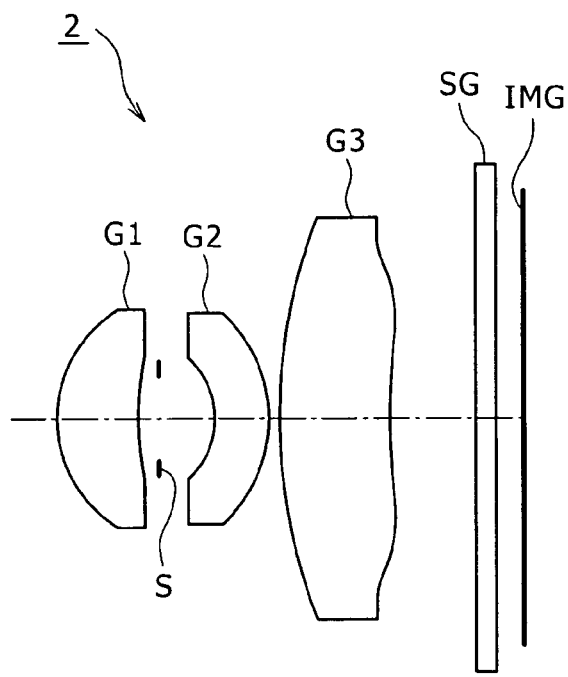
FIG. 3 is a schematic view showing a lens construction of the second embodiment of the image capture lens.
Figure 5:
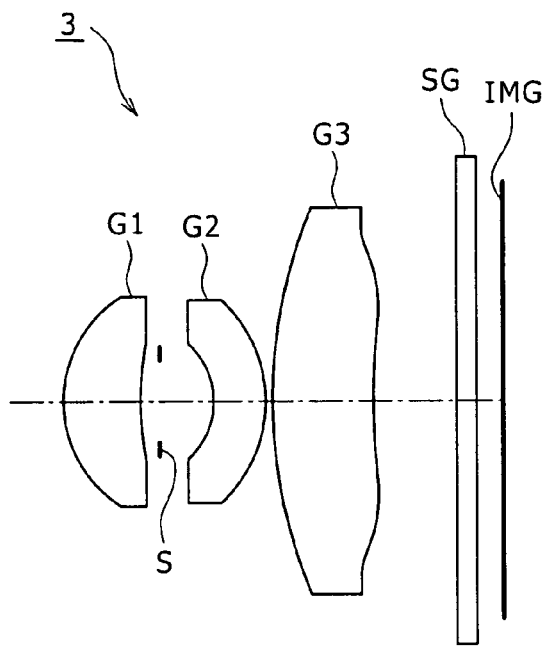
FIG. 5 is a schematic view showing a lens construction of the third embodiment of the image capture lens.

FIG. 1 is a schematic view showing the lens construction of an image capture lens 1 according to the first preferred embodiment, FIG. 3 is a schematic view showing the lens construction of an image capture lens 2 according to the second preferred embodiment, and FIG. 5 is a schematic view showing the lens construction of an image capture lens 3 according to the third preferred embodiment.

As shown in FIGS. 1, 3 and 5, each of the image capture lenses 1, 2 and 3 lens includes, in the following order from an object side, a first lens G1 made of glass which has a meniscus shape with a convex surface facing the object side and has positive refractive power, an aperture stop S, a second lens G2 made of glass which has a meniscus shape with a convex surface facing an image side and has negative refractive power, and a third lens G3 made of resin which has a convex surface facing the object side and has positive refractive power. In FIGS. 1, 3 and 5, symbol "IMG" denotes an image-forming plane, and symbol "SG" denotes a seal glass which covers the front surface of a package in which a solid-state image capture device is accommodated.

Table 1 shows the data of the optical system of a first numerical embodiment in which specific values are applied to the image capture lens 1. In each of the following tables including Table 1, "FNo" denotes the F number, "f" denotes the focal length of the entire lens system, "2ω" denotes all diagonal view angles, Si denotes the i-th surface counted from the object side, "R" denotes the radius of curvature of the Si surface, "di" denotes the surface separation between the i-th surface and the (i+1)-th surface counted from the object side, "ni" denotes the refractive index at D-line (wavelength 587.6 nm) of a lens having the Si surface on the object side, and "vi" denotes the Abbe number at D-line (wavelength 587.6 nm) of the lens having the Si surface on the object side. In addition, "∞" of the radius of curvature Ri represents that the Si surface is a flat surface, and "ASP" represents that the Si surface is an aspherical surface.

TABLE 1

FNo = 2.8
f = 5.21
2ω = 62.72°

| Si | Ri | di | ni | vi |
|---|---|---|---|---|
| 1 | 1.957(ASP) | 1.14 | 1.583 | 59.5 |
| 2 | 5.652(ASP) | 0.32 | | |
| 3 | ∞ | 0.78 | | |
| 4 | −1.345(ASP) | 0.80 | 1.821 | 24.1 |
| 5 | −1.830(ASP) | 0.12 | | |
| 6 | 3.989(ASP) | 1.56 | 1.530 | 55.8 |
| 7 | 5.039(ASP) | 1.22 | | |
| 8 | ∞ | 0.30 | 1.517 | 64.2 |
| 9 | ∞ | 0.38 | | |
| 10 | IMG | | | |

In the image capture lens 1, the opposite surfaces of all the lenses are made of aspherical surfaces, respectively. Table 2 shows the 4th-, 6th-, 8th-, 10th-, 12th-, 14th-, 16th- and 18th-order aspherical coefficients A, B, C, D, E, F, G and H of each of the surfaces in the first numerical embodiment along with the conical coefficient K. In addition, in each of Table 2 and the following tables showing aspherical coefficients, "E-i" is an exponential representation which is to base 10, i.e., "10-i"; for example, "0.26029E−05" represents "0.26029×10−5".

TABLE 2

| Si | K | A | B | C | D | E | F | G | H |
|---|---|---|---|---|---|---|---|---|---|
| 1 | −0.7703 | 1.364E−02 | 1.633E−03 | 1.275E−03 | −3.069E−04 | 0 | 0 | 0 | 0 |
| 2 | 20.9484 | −1.520E−02 | −9.725E−03 | 4.909E−03 | −7.542E−03 | 0 | 0 | 0 | 0 |
| 4 | −0.8811 | −1.790E−02 | −5.284E−02 | 1.207E−01 | −2.523E−01 | 2.672E−01 | −1.245E−01 | −2.727E−02 | 3.670E−02 |
| 5 | 0.2491 | −1.891E−02 | 4.271E−02 | −1.483E−02 | 4.421E−03 | 0 | 0 | 0 | 0 |
| 6 | −51.7785 | −9.479E−03 | 4.576E−03 | −5.753E−04 | 2.747E−05 | 0 | 0 | 0 | 0 |
| 7 | −21.2052 | −1.964E−02 | 9.486E−04 | 6.228E−05 | −1.252E−06 | 0 | 0 | 0 | 0 |

Figure 2:
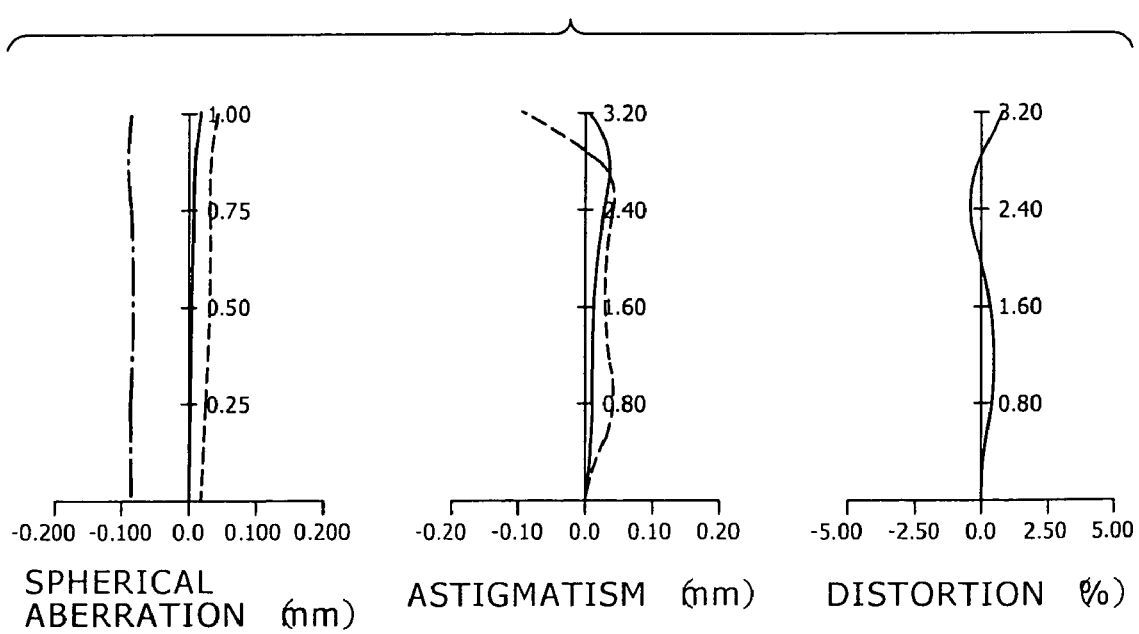
FIG. 2 includes graphs respectively showing the spherical aberration, astigmatism and distortion of the first numerical embodiment in which specific numerical values are applied to the first embodiment of the image capture lens.

FIG. 2 includes graphs respectively showing the spherical aberration, astigmatism and distortion of the first numerical embodiment. In the spherical-aberration graph, a solid line represents spherical aberration at D-line (wavelength 587.6 nm), a dashed line represents spherical aberration at C-line (wavelength 656.28 nm), and a dot-dashed line represents spherical aberration at G-line (wavelength 435.84 nm). In the astigmatism graph, a solid line represents a sagittal image plane and a dashed line represents a meridional image plane.

It can be seen from FIG. 2 that all the aberrations are highly corrected.

Table 3 shows the data of the optical system of a second numerical embodiment in which specific values are applied to the image capture lens 2.

TABLE 3

FNo = 2.8
f = 5.20
2ω = 65.03°

| Si | Ri | di | ni | vi |
|---|---|---|---|---|
| 1 | 1.931(ASP) | 1.12 | 1.583 | 59.5 |
| 2 | 5.389(ASP) | 0.30 | | |

TABLE 3-continued

FNo = 2.8
f = 5.20
2ω = 65.03°

| Si | Ri | di | ni | vi |
|---|---|---|---|---|
| 3 | ∞ | 0.75 | | |
| 4 | −1.375(ASP) | 0.75 | 1.821 | 24.1 |
| 5 | −1.880(ASP) | 0.22 | | |
| 6 | 4.170(ASP) | 1.57 | 1.530 | 55.8 |
| 7 | 6.370(ASP) | 1.23 | | |
| 8 | ∞ | 0.30 | 1.517 | 64.2 |
| 9 | ∞ | 0.37 | | |
| 10 | IMG | | | |

In the image capture lens 2, the opposite surfaces of all the lenses are made of aspherical surfaces, respectively. Table 4 shows the 4th-, 6th-, 8th-, 10th-, 12th-, 14th-, 16th- and 18th-order aspherical coefficients A, B, C, D, E, F, G and H of each of the surfaces in the second numerical embodiment along with the conical coefficient K.

TABLE 4

| Si | K | A | B | C | D | E | F | G | H |
|---|---|---|---|---|---|---|---|---|---|
| 1 | −0.6858 | 1.391E−02 | 8.980E−05 | 2696E−03 | −7.952E−04 | 0 | 0 | 0 | 0 |
| 2 | 18.4882 | −1.557E−02 | −1.068E−02 | 7.844E−04 | −4.827E−03 | 0 | 0 | 0 | 0 |
| 4 | −0.6311 | −3.887E−02 | −6.302E−03 | 5.866E−02 | −2.294E−01 | 2.953E−01 | −1.378E−01 | −3.743E−03 | −1.281E−05 |
| 5 | 0.4237 | −2.418E−02 | 3.980E−02 | −1.249E−02 | 4.833E−03 | 0 | 0 | 0 | 0 |
| 6 | −48.0081 | −1.175E−02 | 4.749E−03 | −5.716E−04 | 2.676E−05 | 0 | 0 | 0 | 0 |
| 7 | −32.1804 | −1.473E−02 | 5.950E−05 | 9.708E−05 | −1.029E−06 | 0 | 0 | 0 | 0 |

Figure 4:
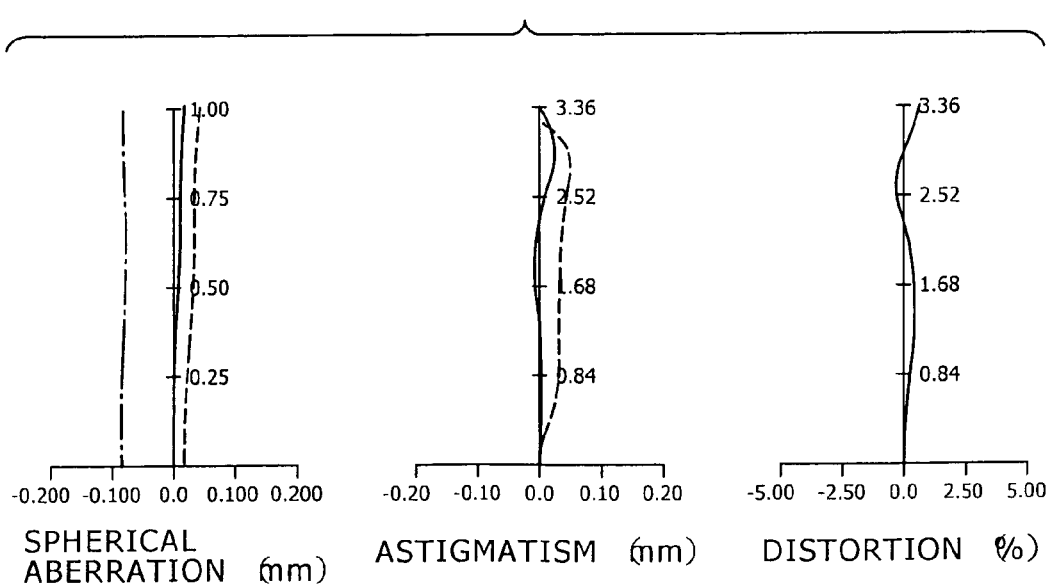
FIG. 4 includes graphs respectively showing the spherical aberration, astigmatism and distortion of the second numerical embodiment in which specific numerical values are applied to the second embodiment of the image capture lens.

FIG. 4 includes graphs respectively showing the spherical aberration, astigmatism and distortion of the second numerical embodiment. In the spherical-aberration graph, a solid line represents spherical aberration at D-line (wavelength 587.6 nm), a dashed line represents spherical aberration at C-line (wavelength 656.28 nm), and a dot-dashed line represents spherical aberration at G-line (wavelength 435.84 nm). In the astigmatism graph, a solid line represents a sagittal image plane and a dashed line represents a meridional image plane.

It can be seen from FIG. 4 that all the aberrations are highly corrected.

Table 5 shows the data of the optical system of a third numerical embodiment in which specific values are applied to the image capture lens 3.

TABLE 5

FNo = 2.8
f = 5.21
2ω = 62.69°

| Si | Ri | di | ni | vi |
|---|---|---|---|---|
| 1 | 1.945(ASP) | 1.21 | 1.583 | 59.5 |
| 2 | 5.123(ASP) | 0.36 | | |
| 3 | ∞ | 0.78 | | |
| 4 | −1.273(ASP) | 0.75 | 1.821 | 24.1 |
| 5 | −1.680(ASP) | 0.10 | | |
| 6 | 4.297(ASP) | 1.50 | 1.530 | 55.8 |
| 7 | 5.493(ASP) | 1.19 | | |
| 8 | ∞ | 0.30 | 1.562 | 64.2 |
| 9 | ∞ | 0.37 | | |
| 10 | IMG | | | |

In the image capture lens 2, the opposite surfaces of all the lenses are made of aspherical surfaces, respectively. Table 6 shows the 4th-, 6th-, 8th-, 10th-, 12th-, 14th-, 16th- and 18th-order aspherical coefficients A, B, C, D, E, F, G and H of each of the surfaces in the third numerical embodiment along with the conical coefficient K.

TABLE 6

| Si | K | A | B | C | D | E | F | G | H |
|---|---|---|---|---|---|---|---|---|---|
| 1 | −0.7232 | 1.319E−02 | 3.715E−04 | 1.628E−03 | −3.596E−04 | 0 | 0 | 0 | 0 |
| 2 | 14.9398 | −1.597E−02 | −1.253E−02 | 7.217E−03 | −6.081E−03 | 0 | 0 | 0 | 0 |
| 4 | −0.6711 | −3.318E−02 | −5.750E−02 | 8.944E−02 | −2.374E−01 | 2.766E−01 | −1.448E−01 | −1.414E−03 | 1.555E−05 |
| 5 | 0.1089 | −2.577E−02 | 3.760E−02 | −1.535E−02 | 5.219E−03 | 0 | 0 | 0 | 0 |
| 6 | −62.7112 | −1.118E−02 | 4.690E−03 | −5.659E−04 | 2.660E−05 | 0 | 0 | 0 | 0 |
| 7 | −29.9153 | −1.745E−02 | 4.289E−04 | 7.831E−05 | 5.032E−08 | 0 | 0 | 0 | 0 |

Figure 6:
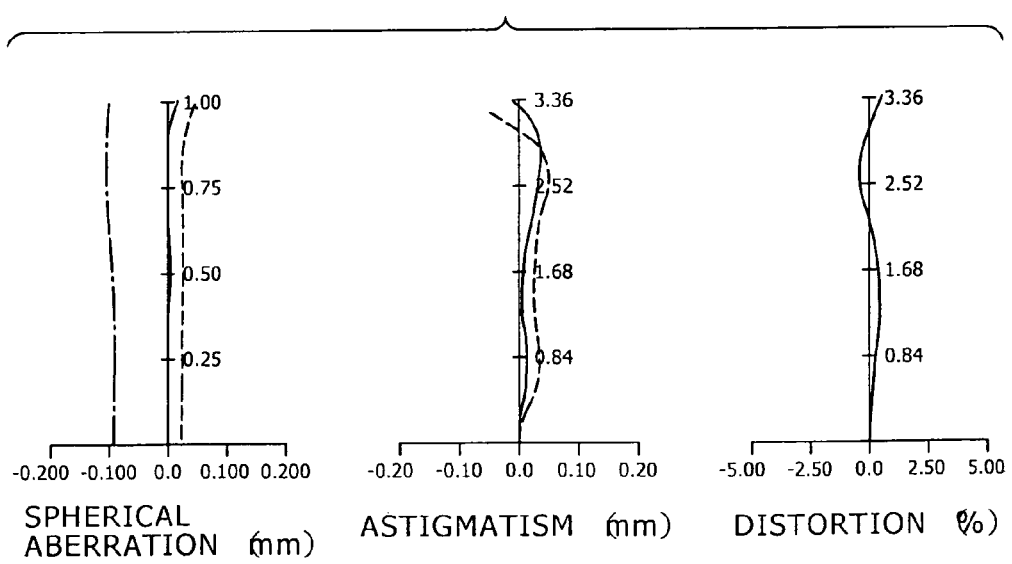
FIG. 6 includes graphs respectively showing the spherical aberration, astigmatism and distortion of the third numerical embodiment in which specific numerical values are applied to the third embodiment of the image capture lens.

FIG. 6 includes graphs respectively showing the spherical aberration, astigmatism and distortion of the third numerical embodiment. In the spherical-aberration graph, a solid line represents spherical aberration at D-line (wavelength 587.6 nm), a dashed line represents spherical aberration at C-line (wavelength 656.28 nm), and a dot-dashed line represents spherical aberration at G-line (wavelength 435.84 nm). In the astigmatism graph, a solid line represents a sagittal image plane and a dashed line represents a meridional image plane.

It can be seen from FIG. 6 that all the aberrations are highly corrected.

Table 7 shows values corresponding to the conditional formulae (1) to (4) of the first to third numerical embodiments.

TABLE 7

| CONDITIONAL FORMULA | | FIRST EMBODIMENT | SECOND EMBODIMENT | THIRD EMBODIMENT |
|---|---|---|---|---|
| (1) | f2/f | −4.67 | −3.61 | −7.33 |
| (2) | f3/f | 4.59 | 3.51 | 4.99 |
| (3) | Fno | 2.8 | 2.8 | 2.8 |
| (4) | d/f | 0.21 | 0.20 | 0.22 |

It can be seen from Table 7 that each of the first to third numerical embodiments satisfies the conditional formulae (1) to (3).

Figure 7:
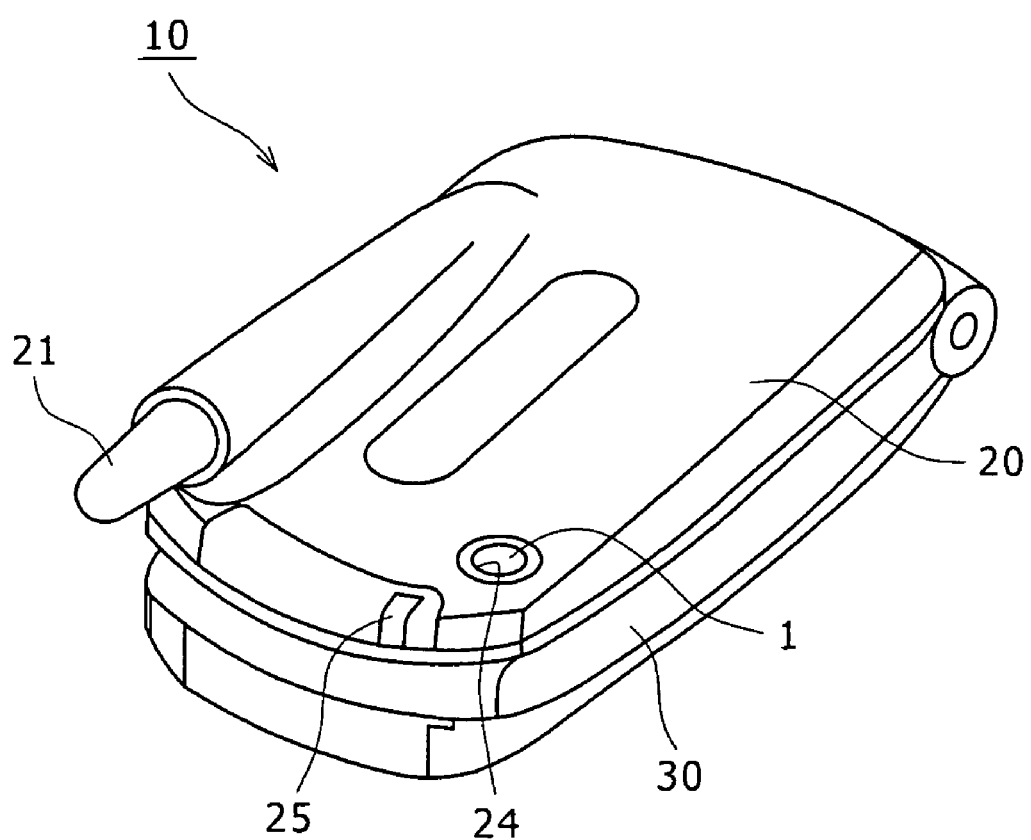
FIG. 7 is a schematic perspective view showing, along with FIGS. 8 and 9, an embodiment in which the image capture device is applied to a mobile telephone, and showing a use mode of the mobile telephone.
Figure 8:
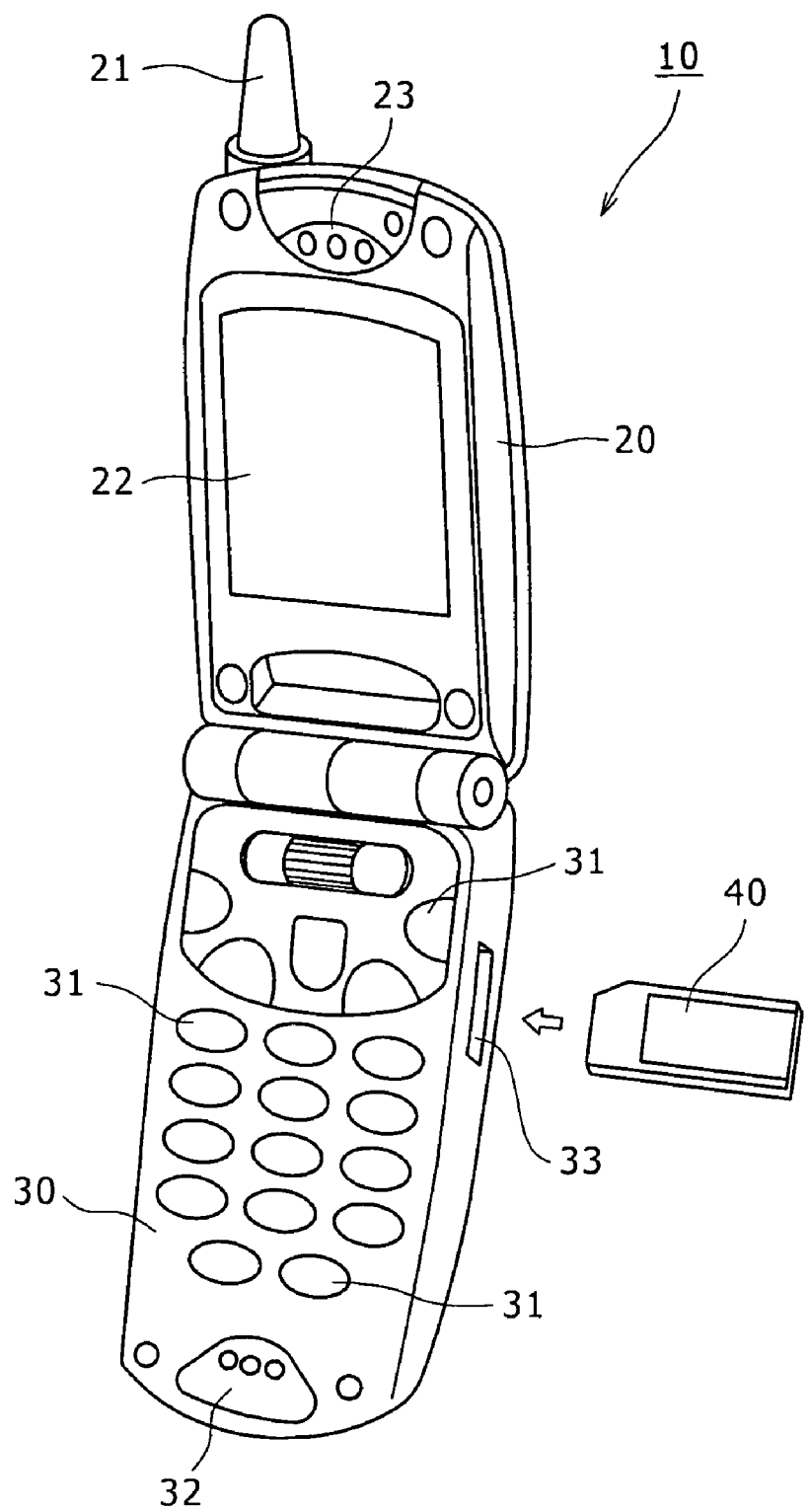
FIG. 8 is a schematic perspective view showing a non-use mode of the mobile telephone.
Figure 9:
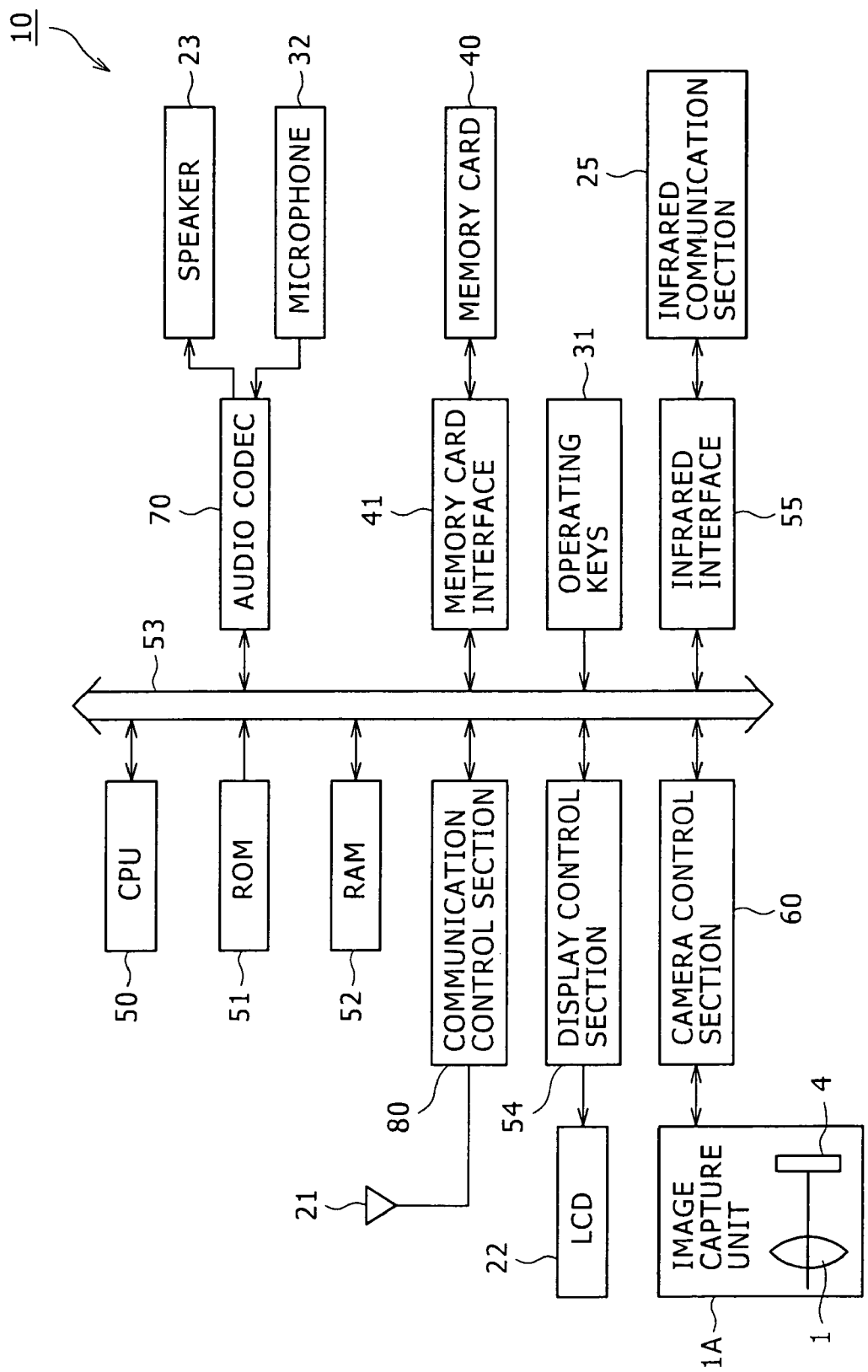
FIG. 9 is a block diagram of the mobile telephone.

FIGS. 7 to 9 show an embodiment in which the image capture device is applied to a mobile telephone equipped with a digital camera section.

A mobile telephone 10 includes a display section 20 and a body section 30 which are foldably joined together at the central hinge section. When the mobile telephone 10 is to be carried, the display section 20 and the body section 30 are placed in a folded state as shown in FIG. 7, while when the mobile telephone 10 is to be used for communication or the like, the display section 20 and the body section 30 are placed in an open state as shown in FIG. 8.

An antenna 21 for transmitting and receiving radio waves to and from a base station is retractably provided at a location close to one side of the back of the display section 20. A liquid crystal display panel 22 which is of a size to occupy approximately the whole of the inside surface of the display section 20 is arranged on the inside surface of the display section 20, and a speaker 23 is arranged above the liquid crystal display panel 22.

In addition, an image capture unit 1A of the digital camera section is arranged in the display section 20, and the image capture lens 1 (or the image capture lens 2 or 3) of the image capture unit 1A faces outward via a facing hole 24 formed in the back of the display section 20. It is assumed here that the term "image capture unit" is defined as a construction including the image capture lens 1 and an image capture device 4.

In other words, the concept of the image capture unit is herein used to make it clear that the image capture lens 1 and the image capture device 4 need to be provided in the display section 20 at the same time, but the other sections constituting the digital camera section, for example, a camera control section and a recording medium, may also be arranged in the body section 30. A photoelectric conversion device such as a CCD (Charge Coupled Device) or a CMOS (Complementary Metal-Oxide Semiconductor) can be applied to the image capture device 4.

In addition, an infrared communication section 25 is arranged in an external end section of the display section 20, and the infrared communication section 25 is equipped with an infrared light emitting device and an infrared light receiving device.

The inside surface of the body section 30 is provided with operating keys 31, 31, . . . , such as number keys 0 to 9, a call key and a power key, and a microphone 32 is arranged below a section in which the operating-keys 31, 31, . . . , are arranged. A memory card slot 33 is provided on one side of the body section 30 so that a memory card 40 can be inserted and removed into and from the body section 30 via the memory card slot 33.

FIG. 9 is a block diagram showing the construction of the mobile telephone 10.

The mobile telephone 10 includes a CPU (Central Processing Unit) 50, and the CPU 50 controls the operation of the entire mobile telephone 10. Specifically, the CPU 50 extracts the control program stored in a ROM (Read Only Memory) 51 into a RAM (Random Access Memory) 52, and controls the operation of the mobile telephone 10 via a bus 53.

A camera control section 60 takes an image such as a still image or a moving image by controlling the image capture unit 1A including the image capture lens 1 and the image capture device 4, and performs processing such as compression of the obtained image information into a JPEG or MPEG format or the like and transmits the processed image information to the bus 53. The image information transmitted to the bus 53 is temporarily stored in the RAM 52, and is outputted to the memory card interface 41 as occasion demands and is stored into the memory card 40 via the memory card interface 41 or is displayed on the liquid crystal display panel 22 via a display control section 54.

In addition, audio information which has been recorded through the microphone 32 at the same time that the image has been taken is temporarily stored in the RAM 52 along with the image information, and is stored into the memory card 40 along with the image information, or is outputted from the speaker 23 via an audio codec 70 at the same time as the display of the image on the liquid crystal display panel 22.

In addition, the image information and the audio information are outputted to an infrared interface 55 as occasion demands, and is outputted to the outside via the infrared communication section 25 by the infrared interface 55 and is transmitted to an outside information apparatus provided with a similar infrared communication section, such as a mobile telephone, a personal computer or a PDA (Personal Digital Assistant).

When a moving image or a still image is to be displayed on the liquid crystal display panel 22 on the basis of the image information stored in the RAM 52 and the memory card 40, image data obtained by decoding or extracting a file stored in the RAM 52 or the memory card 40 in the camera control section 60 is transmitted to the display control section 54 via the bus 53.

A communication control section 80 performs transmission and reception of radio waves to and from a base station via the antenna 21. When the mobile telephone 10 is in an audio communication mode, the communication control section 80 processes received audio information and outputs the processed audio information to the speaker 23 via the audio codec 70, and receives sound collected by the microphone 32 via the audio codec 70 and transmits the sound after applying predetermined processing to the same.

The above-mentioned image capture lens 1 (or the image capture lens 2 or 3), which can be reduced in depth, can readily be incorporated into an apparatus limited in thickness, such as the mobile telephone 10. In addition, the image capture lens 1 (or the image capture lens 2 or 3), which is unsusceptible to ambient temperature, can be used in a wide range of regions. The above description of the preferred and numerical embodiments has referred to an example in which the image capture device is applied to a mobile telephone, but the image capture device can of course be applied to other information equipment such as personal computers or PDAs and can achieve great advantages when applied to such other information equipment.

The present application contains subject matter related to Japanese Patent Application JP 2005-347461 filed in the Japanese Patent Office on Dec. 1, 2005, the entire content of which being incorporated herein by reference.

The specific structures and shapes as well as the numerical values that have been referred to in the above description of the embodiments and the numerical embodiments are provided merely as one example for illustrative purposes for ease of understanding of various embodiments for carrying out the present invention, and these embodiments are not to be construed as limiting the technical scope of the present invention.

What is claimed is:

1. An image capture lens comprising:
   in following order from an object side, a first lens made of glass which has a meniscus shape with a convex surface facing the object side and has positive refractive power, an aperture stop, a second lens made of glass which has a meniscus shape with a convex surface facing an image side and has negative refractive power, and a third lens made of resin which has a convex surface facing the object side and has positive refractive power;
   wherein the image capture lens satisfies following conditional formulae (1) and (2):

$$f2/f < -3.5, \text{ and} \quad (1)$$

$$f3/f > 3.5, \quad (2)$$

where f: focal length of the entire lens system;
   f2: focal length of the second lens; and
   f3: focal length of the third lens, and
   wherein following conditional formulae (3) and (4) are satisfied:

$$Fno < 3.5, \text{ and} \quad (3)$$

$$0.19 \leq d/f \leq 0.25, \quad (4)$$

where Fno: F number of the image capture lens;
   f: focal length of the entire lens system; and
   d: distance along the optical axis from an image-side surface of the first lens to an object-side surface of the second lens.

2. An image capture lens according to claim 1, wherein:
   all surfaces of the first lens, the second lens and the third lens are formed in aspherical shapes.

3. An image capture apparatus comprising:
   an image capture lens; and
   an image capture device which converts an optical image formed by the image capture lens into an electrical signal;
   wherein the image capture lens includes,
   in following order from an object side, a first lens made of glass which has a meniscus shape with a convex surface facing the object side and has positive refractive power, an aperture stop, a second lens made of glass which has a meniscus shape with a convex surface facing an image side and has negative refractive power, and a third lens made of resin which has a convex surface facing the object side and has positive refractive power;
   wherein the image capture lens satisfies the following conditional formulae (1) and (2):

$$f2/f < -3.5, \text{ and} \quad (1)$$

$$f3/f > 3.5, \quad (2)$$

where f: focal length of the entire lens system;
   f2: focal length of the second lens; and
   f3: focal length of the third lens and
   wherein the image capture lens satisfies the following conditional formulae (3) and (4):

$$Fno < 3.5, \text{ and} \quad (3)$$

$$0.19 \leq d/f \leq 0.25, \text{ where} \quad (4)$$

Fno: F number of the image capture lens;
   f: focal length of the entire lens system; and
   d: distance along the optical axis from an image-side surface of the first lens to an object-side surface of the second lens.

* * * * *